United States Patent
Samie et al.

(10) Patent No.: US 8,061,496 B2
(45) Date of Patent: Nov. 22, 2011

(54) COMPACT SELECTION MECHANISM FOR A SELECTABLE ONE-WAY CLUTCH

(75) Inventors: Farzad Samie, Franklin, MI (US);
Andrew L. Bartos, Clarkston, MI (US);
Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 712 days.

(21) Appl. No.: 12/177,453

(22) Filed: Jul. 22, 2008

(65) Prior Publication Data
US 2010/0018795 A1    Jan. 28, 2010

(51) Int. Cl.
*F16D 41/08*    (2006.01)
(52) U.S. Cl. .......................... 192/43; 192/47
(58) Field of Classification Search .............. 192/69.1, 192/85.48
See application file for complete search history.

(56) References Cited

U.S. PATENT DOCUMENTS

| | | | |
|---|---|---|---|
| 2,700,444 A * | 1/1955 | Gustav | 192/85.48 |
| 6,290,044 B1 | 9/2001 | Burgman et al. | |
| 6,905,009 B2 * | 6/2005 | Reed et al. | 192/43.1 |
| 7,699,746 B2 * | 4/2010 | Maguire et al. | 192/69.1 |
| 2005/0130789 A1 * | 6/2005 | Samie et al. | 475/284 |
| 2007/0099758 A1 | 5/2007 | Maguire et al. | |
| 2007/0184933 A1 | 8/2007 | Maguire et al. | |
| 2007/0278061 A1 | 12/2007 | Wittkopp et al. | |
| 2008/0000747 A1 * | 1/2008 | Saka | 192/43.2 |
| 2008/0169165 A1 | 7/2008 | Samie et al. | |

* cited by examiner

*Primary Examiner* — Rodney Bonck
(74) *Attorney, Agent, or Firm* — Quinn Law Group, PLLC

(57) ABSTRACT

A vehicle includes an automatic transmission having an engine, an input member, a stationary center support, and a selectable one-way clutch (SOWC) positioned within the stationary center support. A SOWC selection mechanism is formed integrally with the center support, and rotates a slide plate during a predetermined transmission operating mode. A piston in a first bore of the selection mechanism rotates the slide plate in a first rotational direction to engage the SOWC, and a return spring in a second bore of the selection mechanism rotates the SOWC in a second direction to disengage the SOWC. The slide plate has a tab portion, and the piston and the return spring alternately apply a respective first and second force to opposite sides of the tab portion to rotate the slide plate, either directly or via an adapter ring.

13 Claims, 3 Drawing Sheets

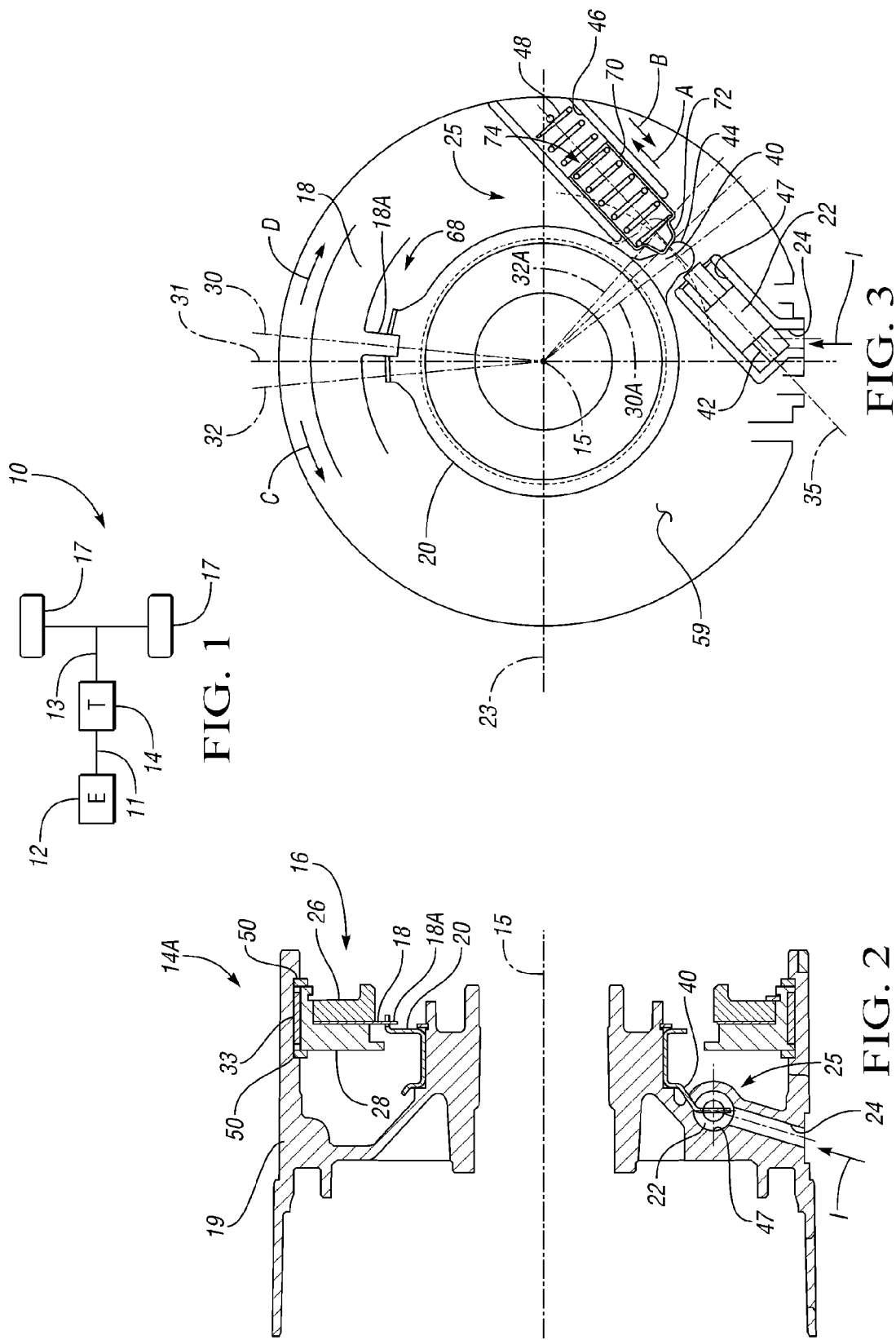

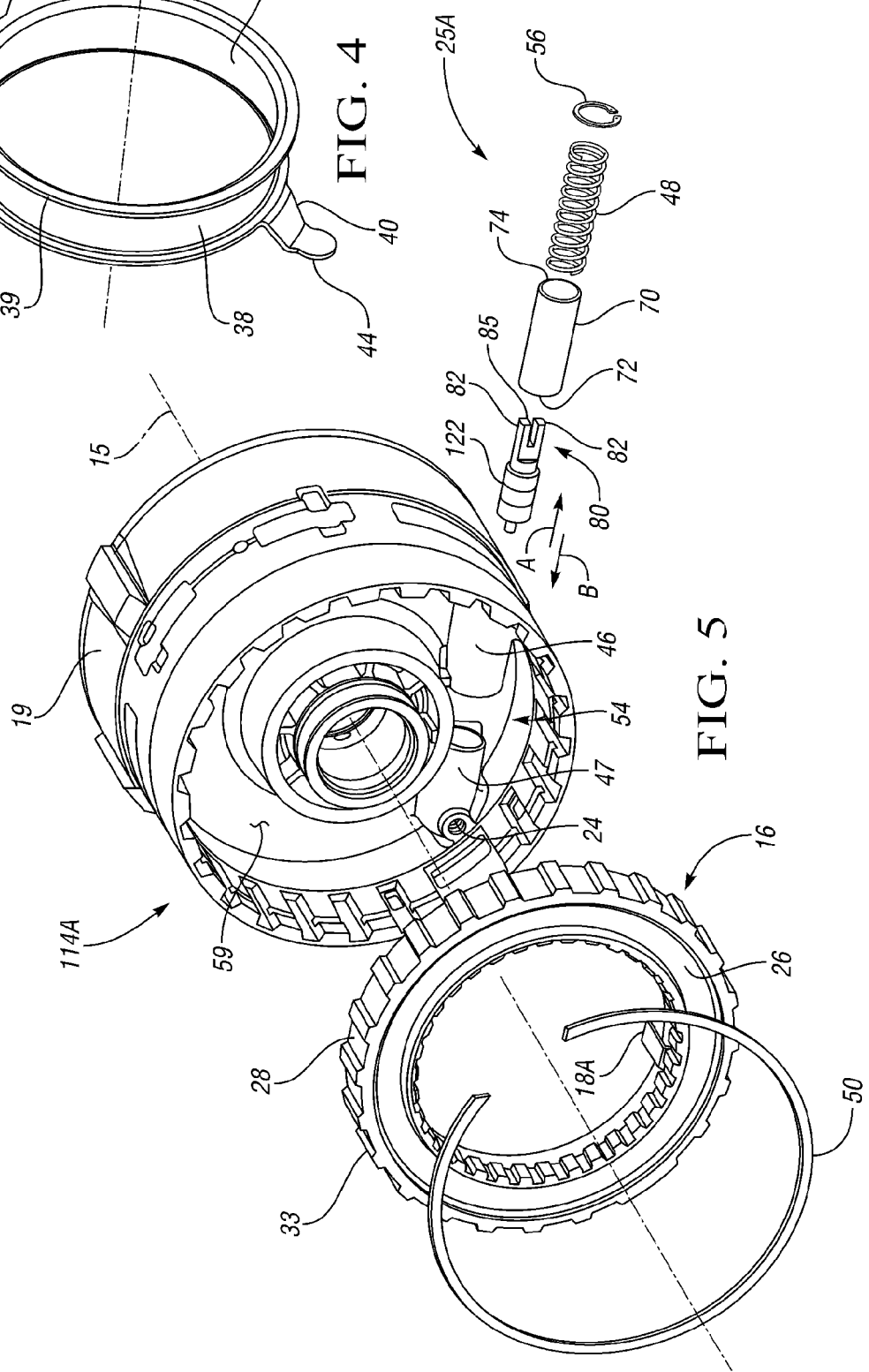

US 8,061,496 B2

COMPACT SELECTION MECHANISM FOR A SELECTABLE ONE-WAY CLUTCH

TECHNICAL FIELD

The present invention relates to a center support for an automatic transmission, wherein the center support contains a two-mode selectable one-way clutch (SOWC) and a compact selection mechanism adapted for selecting between the two modes of the SOWC.

BACKGROUND OF THE INVENTION

In an automotive transmission, a selectable one-way clutch (SOWC) is a torque transfer mechanism that is capable of producing a mechanical connection between a driving member of the transmission via a rotatable input race or a first coupling plate of the SOWC, and an independent driven member of the transmission via an output race or second coupling plate of the SOWC, in one or both rotational directions. A SOWC can overrun in one or both directions of rotation depending on its particular design. Typically, a SOWC contains a selector device, such as a selection ring or a slide plate, the movement of which selects the operating mode of the SOWC.

The mechanical means used to lock a SOWC are varied. For example, a SOWC can use rollers, sprags, rockers, struts, or another suitable torque-transmitting element, a plurality of which are positioned between the input and output races of the SOWC. Depending on the particular type or style of SOWC used and the required direction of rotation and torque holding, each race may contain unique surface features, such as windows or strut wells, each being suitable for engaging one or more of the torque-transmitting elements positioned therein in order to selectively enable various clutch operating modes.

SUMMARY OF THE INVENTION

Accordingly, a vehicle is provided having a transmission. The transmission includes a stationary center support and a two-mode selectable one-way clutch (SOWC) positioned within the center support and supported therein. The center support includes a compact selection mechanism that is integrated with and/or contained within the center support. The selection mechanism is operable for selectively engaging and disengaging the SOWC during one or more predetermined transmission operating modes.

Within the scope of the invention, the selection mechanism includes a moveable piston and a return spring each contained within a respective chamber or bore formed integrally with the center support. The piston is in continuous contact with a slide plate of the SOWC, either directly with a tab portion of the slide plate or indirectly via an optional adapter ring, depending on the available packaging space of the transmission. Motion of the piston in one direction ultimately rotates the slide plate of the SOWC in a corresponding direction, thus establishing a first SOWC mode. Likewise, motion of the piston in another direction establishes a second SOWC mode.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is schematic illustration of a vehicle in accordance with the invention;

FIG. 2 is a cross-sectional schematic illustration of a center support and SOWC of the transmission of FIG. 1;

FIG. 3 is a cross-sectional schematic illustration of the center support and SOWC of FIG. 2;

FIG. 4 is a schematic perspective view of an adaptor ring usable with the center support and SOWC of FIGS. 2-3;

FIG. 5 is an exploded view of the center support and SOWC according to another embodiment.

DESCRIPTION OF THE PREFERRED EMBODIMENTS

Figure 6:
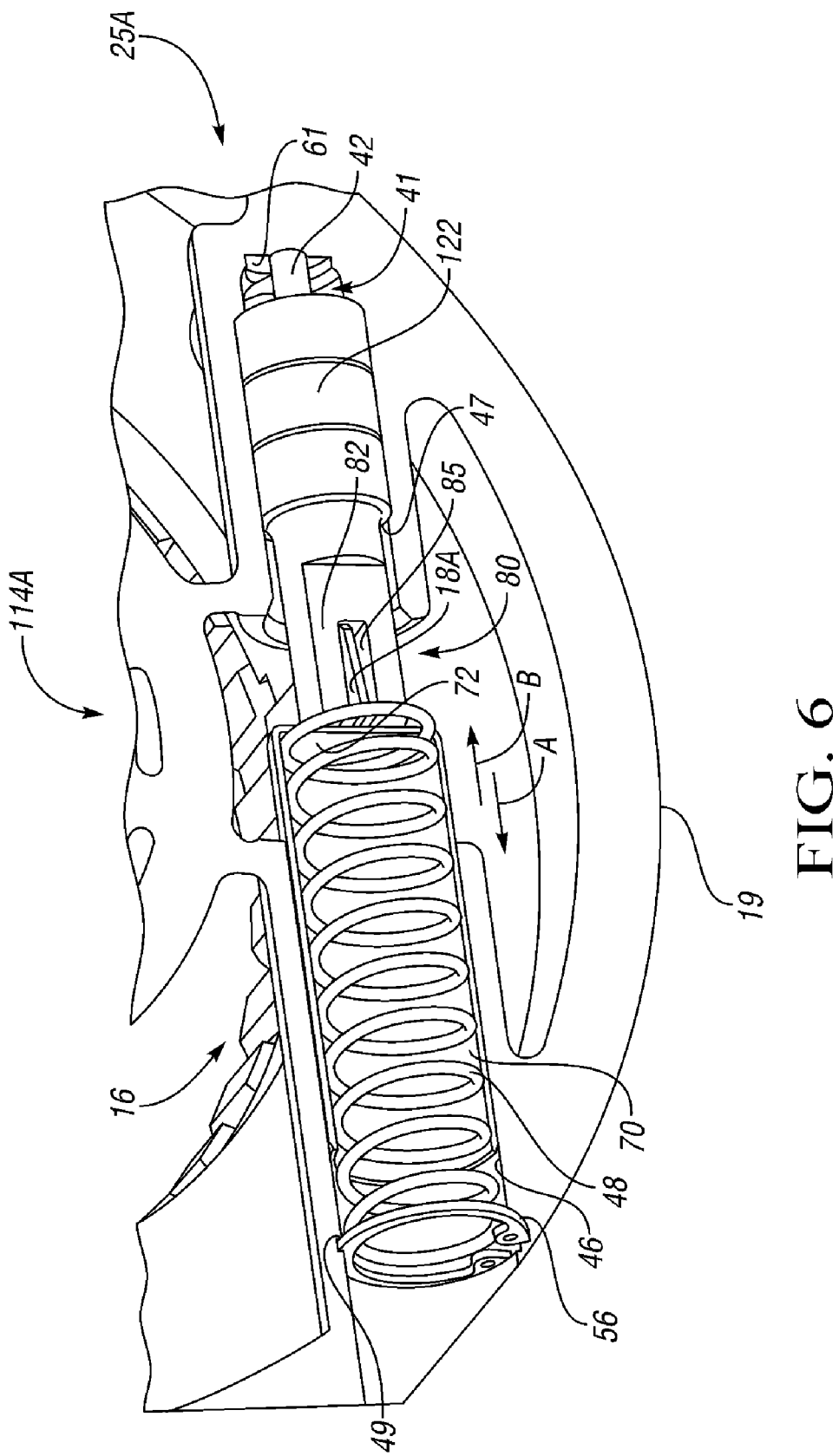
FIG. 6 is a schematic perspective view of a portion of the center support and SOWC of FIG. 5.

With reference to the Figures, wherein like reference numerals refer to like or similar components throughout the several figures, and beginning with FIG. 1, a vehicle 10 includes an engine (E) 12, such as a gasoline, diesel, or alternative fuel internal combustion engine, although other power sources may be used within the scope of the invention. For example, the engine 12 could be also or alternatively configured as a fuel cell or battery-powered electric motor, or another alternative power source to the conventional internal combustion engine. The engine 12 is selectively or continuously connected to an automatic transmission (T) 14 via an input member or shaft 11. The transmission 14 transmits a rotational force or torque to an output member or shaft 13, which ultimately propels the vehicle 10 via a set of road wheels 17.

Referring to FIG. 2, a portion 14A of the transmission 14 of FIG. 1 includes a center support 19 and a two-mode selectable one-way clutch (SOWC) 16 of the type known in the art. The center support 19 has a main bore 34, and can be constructed of cast metal or another suitable material. The SOWC 16 is disposed or positioned within the center support 19, and supported therein, with the center support 19 held stationary within a housing or case (not shown) of the transmission 14 of FIG. 1. The SOWC 16 includes an inner race or a driving member 26 and an outer race or driven member 28, each of with have a centerline or axis of rotation 15 in common with the transmission 14.

The driven member 28 is indexed to, affixed, or grounded to the center support 19, such as by using a plurality of splines 33 and/or one or more retaining rings 50. The driving member 26 is connected to an output gear set (not shown). The SOWC 16 can selectively transmit torque between the driving member 26 and the driven member 28 in one rotational direction by moving a selector plate or slide plate 18 positioned between the members 26, 28 of the SOWC 16. Reversing the direction of rotation of the driving member 26 in turn enables the driving member 26 to freewheel with respect to the driven member 28.

Still referring to FIG. 2, the center support 19 includes a SOWC control device or a compact SOWC selection mechanism 25, with the selection mechanism 25 being integrally formed with the center support 19 as described below. The selection mechanism 25 is operable for shifting or selecting between the two different modes of the two-mode SOWC 16 by applying a direct or an indirect force on a rotatable selection ring or a slide plate 18 of the SOWC 16. The two modes of the SOWC 16 include a "reverse" torque-holding mode when the SOWC 16 is applied or engaged and a "forward" freewheeling mode when the SOWC 16 is released or disengaged.

In particular, the selection mechanism 25 includes a piston bore 47 and a spring bore 46 (see FIGS. 3, 5, and 6) that are cast, bored, or otherwise integrally provided or formed with the center support 19. The selection mechanism 25 further includes a hydraulically-actuated piston 22 that is moveable within the piston bore 47 in response to pressurized fluid, as represented by the arrow I. A fluid channel 24 is in fluid communication with the piston bore 47, and a return spring 48 is disposed within the spring bore 46 (see FIGS. 3 and 4). Selective movement of the piston 22 ultimately rotates the slide plate 18 of the SOWC 16, either directly or indirectly as described below, in order to select between different operating modes of the SOWC 16 as needed.

Referring to FIG. 3, the transmission portion 14A of FIG. 2 is shown schematically for clarity. The center support 19 has a vertical centerline 31 and a horizontal centerline 23 bisecting the main bore 34. The main bore 34 circumscribes the axis of rotation 15 of the SOWC 16 and of the transmission 14 (see FIG. 1). Within the center support 19, the piston bore 47 and the spring bore 46 are cast, bored, or otherwise integrally formed with the center support 19, as noted above, and have a common axis 35. The piston bore 47 is in fluid communication with the fluid channel 24, through which pressurized fluid is selectively admitted into an apply chamber 41 of the piston bore 47 as represented by arrow I.

In the exemplary embodiment of FIG. 3, also shown in FIG. 2, an adapter ring 20 provides an indirect method of engaging the SOWC 16. The indirect method includes connecting a radial arm or lever 40 of the adapter ring 20 to an extension or a tab portion 18A of the slide plate 18. Pressurized fluid (arrow I) pushes or moves the piston 22 in the direction of arrow A along the common axis 35 within the piston bore 47, thus pushing or moving the lever 40 from a first position 30A corresponding to a first angular position 30 of the slide plate 18 to a second position 32A corresponding to a second angular position 32 of the slide plate 18. The slide plate 18 therefore rotates in the direction of arrow C as the adapter ring 20 applies a force to a lateral side of the tab portion 18A. The piston 22 compresses the return spring 48 when moved to the position 32A. The return spring 46 is contained within a cylindrical spring sleeve 70 having an open end 74 and a closed end 72. The closed end 72 of the spring sleeve 70 contacts the shaped end 44 of the radial arm or lever 40 of the adapter ring 20, which in turn is in direct contact with the piston 22. When the admission of fluid (arrow I) into the piston bore 47 is discontinued, the return spring 48 provides a sufficient return force in the direction of arrow B to thereby push or move the lever 40 back into position 30A, thus applying a force to another lateral side of the tab portion 18A and rotating the slide plate 18 in the direction of arrow D.

To ensure proper rotation of the slide plate 18 of the SOWC 16, the piston 22 is placed in direct continuous contact with the lever 40 of the adapter ring 20, with the return spring 48 biasing the closed end 72 into continuous contact with the lever 40. The lever 40 may include a shaped end 44, such as a cylindrical or a circular end as shown, with the shape end 44 being suitable for engaging the piston 22. The adapter ring 20 also has a guide feature 68 adapted to engage an extension or a selection tab 18A of the slide plate 18, such that any movement of the lever 40 ultimately rotates the slide plate 18 within the SOWC 16.

Referring to FIG. 4, the adaptor ring 20 of FIGS. 2 and 3 is shown in perspective view. Within the scope of the invention, the adaptor ring 20 can be used to bridge a distance between the tab portion 18A of the slide plate 18 (see FIGS. 2 and 3), although the tab portion 18A can also be extended and connected directly to the piston as shown in FIG. 5 and described below, depending on available packaging space. Likewise, use of the adapter ring 20 may confine any overturning moment to the adaptor ring 20 rather than introduce such a moment into the structure of the slide plate 18. The optional adapter ring 20 defines an annular wall 36 having an outer surface 38, and a pair of radial walls 39 connected to or formed integrally with the outer surface 38 for securing the adapter ring 20 to the center support 19 (see FIG. 2). The adapter ring 20 includes the lever 40, which is a radial extension of one of the radial walls 39. The lever 40 and its shaped end 44 are continuously contacted by the piston 22 as shown in FIG. 3.

The tab portion 18A of the slide plate 18 (see FIG. 2) is engaged by a guide feature 68 of the adaptor ring 20, with the guide feature 68 being an extension of or operatively connected to another one of the radial walls 39. The guide feature 68 can include a pair of axial tabs 62 defining a groove or a notch 64 therebetween. The tab portion 18A of the slide plate 18 (see FIG. 2) can then be inserted into the notch 64 and trapped or secured therein. Rotation of the adaptor ring 20 thus presses or forces one of the axial tabs 62 against a lateral surface of the tab portion 18A, and ultimately rotates the slide plate 18 within the SOWC 16 (see FIG. 2).

Referring to FIG. 5, an alternate transmission portion 114A is provided for directly moving the slide plate 18 of the SOWC 16 using an alternate piston 122, and therefore the alternate transmission portion 114A does not include the optional adapter ring 20 described above. As with the transmission portion 14A of FIGS. 2 and 3, a retaining ring 50 can be used to secure the SOWC 16 within the center support 19 as needed. The piston bore 47 and the spring bore 46, separated by a gap 54, are each integrally formed with the center support 19 on the side or surface 59 thereof, with the piston bore 47 being fed by or in fluid communication with pressurized fluid (see arrow I of FIGS. 2 and 3) via the fluid channel 24, as described above.

An actuator portion 25A of the selection mechanism 25 of FIG. 3 includes a piston 122 and the return spring 48. The return spring 48 is contained within a cylindrical spring sleeve 70 having an open end 74 and a solid or closed end 72. A retaining ring 56 can be positioned within the spring bore 46 and contained within an annular groove 49 (see FIG. 6) to provide a stationary surface against which the return spring 48 can react, or the spring bore 46 can be provided with another suitable reaction surface or feature.

When fluid is admitted into the fluid channel 24, the piston 122 moves in the direction of arrow A, as described above for piston 22 of FIGS. 2 and 3. The piston 122 is operatively connected to or formed integrally with a shaped end 80 adapted to engage the tab portion 18A of the slide plate 18. For example, the shaped end 80 can be configured with a forked end as shown in FIG. 5, with the tab portion 18A being directly insertable into a slot or a piston notch 85 defined by a pair of prongs 82 of the shaped end 80. However, other configurations can be envisioned within the scope of the invention, such as but not limited to a through-hole, a fastener, a welded connection, etc. The shaped end 80 contacts the closed end 72 of the spring sleeve 70, thus pushing the spring sleeve 70 in the direction of arrow A when pressurized fluid is admitted into the piston bore 47 via the fluid channel 24.

Referring to FIG. 6, the transmission portion 114A includes the piston 122 positioned within the piston bore 47 and the return spring 48 positioned within the cylindrical spring sleeve 70 in the spring bore 46. The return spring 48 reacts against the retaining ring 56 as described above, which is secured within an annular groove 49 formed or provided in the spring bore 46. The return spring 48 therefore biases the closed end 72 of the cylindrical spring sleeve 70 into contact with the piston 122.

The piston 122 can include a stop 42, such as a pin, bumper, rod, cap, etc., within the apply chamber 41. The stop 42 ensures that the fluid channel 24 (see FIG. 5) remains unblocked by preventing contact between the piston 122 and a wall 61 of the apply chamber 41. The stop 42 can alternately be connected to the wall 61 rather than the piston 122 within the scope of the invention. The tab portion 18A of the slide plate 18 (see FIGS. 2 and 3) engages with the shaped end 80 of the piston 122. In an exemplary embodiment, the shaped end 80 includes the pair of prongs 82 which define the piston notch 85 therebetween, with the tab portion 18A engaged with the piston notch 85.

Accordingly, as fluid (not shown) fills the apply chamber 41, the tab portion 18A moves in the direction of arrow A in conjunction with the piston 122 to engage or apply the SOWC 16 as described above. Likewise, as that fluid (not shown) is discharged from the apply chamber 41, the tab portion 18A moves in the direction of arrow B in conjunction with the piston 122 as the piston 122 is biased or moved via the spring force provided by the return spring 48 to disengage or release the SOWC 16 as described above.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a transmission having an input member, a stationary center support, and a selectable one-way clutch (SOWC) having two modes, said SOWC being positioned within the stationary center support and supported thereby;
an engine in driving connection with said input member; and
a SOWC selection mechanism formed integrally with said stationary center support, wherein said SOWC selection mechanism includes a return spring and a piston defining a piston notch;
wherein:
said SOWC includes a rotatable slide plate configured to select a first one of said two modes when said rotatable slide plate is rotated in a first rotational direction, and to select a second one of said two modes when said rotatable slide plate is rotated in a second rotational direction;
said piston is configured to rotate said slide plate in said first rotational direction, and to receive a portion of said SOWC within said piston notch such that said selector plate rotates in conjunction with a movement of said piston when said piston is applied; and
said return spring is configured to rotate said slide plate in said second rotational direction when said piston is released.

2. The vehicle of claim 1, wherein said SOWC selection mechanism includes a first bore containing said piston and a second bore containing said return spring, wherein said first bore and said second bore are each formed integrally with said stationary center support.

3. The vehicle of claim 2, wherein said stationary center support is constructed of cast metal, and wherein at least one of said first bore and said second bore is cast integrally with said stationary center support.

4. The vehicle of claim 1, wherein said slide plate includes a tab portion as said portion of said SOWC that is received by said piston notch; and
wherein said piston and said return spring alternately apply a respective first and second force to opposite sides of said tab portion to thereby respectively rotate said slide plate in said first and said second rotational directions.

5. The vehicle of claim 1, wherein said transmission includes an adapter ring having a radial lever as said portion of the SOWC that is received by said piston notch, and a guide notch that is separate from said radial lever, and said slide plate includes a tab portion;
wherein said guide notch directly receives said tab portion therein, and wherein said piston continuously contacts said radial lever such that movement of said piston in one direction when said piston is applied moves said radial lever and said adapter ring with respect to an axis of rotation of the SOWC, thereby rotating said slide plate in said first rotational direction via said tab portion.

6. A transmission comprising:
a stationary center support; and
a selectable one-way clutch (SOWC) having two modes, a rotatable driving member, a driven member indexed to said stationary center support, and a slide plate, said slide plate being rotatable in a first rotational direction within said SOWC to transfer torque from said driving member to said driven member, and in a second rotational direction within said SOWC to allow said driving member to freewheel with respect to said driven member, wherein:
said SOWC selection mechanism includes:
a piston defining a piston notch which receives a portion of said SOWC, and which selectively rotates said slide plate in said first rotational direction when said piston is applied; and
a return spring which rotates said slide plate in said second rotational direction when said piston is released; and
said stationary center support includes a SOWC selection mechanism configured to alternately rotate said slide plate in said SOWC in said first and said second directions.

7. The transmission of claim 6, wherein said stationary center support is constructed of cast metal and includes a first bore containing said piston and a second bore containing said return spring.

8. The transmission of claim 7, wherein each of said first bore and said second bore are constructed of cast metal, and are integrally cast with said stationary center support.

9. The transmission of claim 8, including a source of pressurized fluid;
wherein said first bore is in fluid communication with said source of pressurized fluid, and wherein said source of pressurized fluid is sufficient for moving said piston within said first bore.

10. The transmission of claim 7, including a cylindrical spring sleeve having an open end and a closed end;
wherein said return spring is positioned within said cylindrical spring sleeve, and wherein said return spring biases said closed end into continuous contact with said piston.

11. The transmission of claim 6, further comprising an adapter ring having a radial lever as said SOWC portion that is received by said piston notch, and a guide notch that is separate from said radial lever;
wherein said piston continuously contacts said radial lever such that movement of said piston in one direction rotates said guide notch and said tab portion with respect to an axis of rotation of said SOWC, thereby rotating said slide plate.

12. A selection mechanism for use with a transmission having a stationary center support and a selectable one-way clutch (SOWC) having two modes, the SOWC being disposed within the center support and including a rotatable slide plate having a moveable tab portion for selecting between the two-modes, the selection mechanism comprising:
- a first bore and a second bore each being positioned on a surface of the center support adjacent to the SOWC;
- a piston disposed within said first bore and moveable in a first direction within said first bore, wherein said piston includes a pair of prongs defining a piston notch therebetween, and wherein a portion of said SOWC is received by said piston within said piston notch; and
- a return spring disposed within said second bore and configured to selectively move said piston in a second direction within said first bore;

wherein:
movement of said piston in said first direction moves the moveable tab portion in one manner to rotate the rotatable slide plate in a first rotational direction, thereby establishing one of said two modes; and
movement of said piston in said second direction moves the moveable tab portion in another manner to rotate the rotatable slide plate in a second rotational direction, thereby establishing the other one of said two modes.

13. The selection mechanism of claim 12, further comprising an adapter ring having a radial lever as said portion of the SOWC that is received by said piston notch, and a guide notch that is separate from said radial lever, said guide notch engaging the moveable tab portion;
wherein said radial lever is in direct continuous contact with said piston within said piston notch such that movement of said piston in said first and said second directions alternately rotates said radial lever, said adapter ring, and said guide notch in said first and said second rotational directions, respectively, with respect to an axis of rotation of the SOWC.

* * * * *